United States Patent [19]

Burkhart

[11] Patent Number: 4,516,486
[45] Date of Patent: May 14, 1985

[54] COOKING APPARATUS AND METHOD

[76] Inventor: William H. Burkhart, 225 Avalon Dr., Los Altos, Calif. 94022

[21] Appl. No.: 506,130

[22] Filed: Jun. 20, 1983

[51] Int. Cl.³ ............................................. A47J 37/00
[52] U.S. Cl. ...................................... 99/388; 99/401; 99/422; 99/447; 219/354; 219/464; 422/174; 422/180; 426/523
[58] Field of Search ................. 99/386, 447, 401, 385, 99/388, 390, 331, 332, 422, 423; 219/354, 405, 411, 464; 426/523; 126/41 R; 422/174, 180

[56] References Cited

U.S. PATENT DOCUMENTS

| 3,646,878 | 3/1972 | Keller | 99/339 |
| 3,655,173 | 4/1972 | Costello | 263/8 |
| 3,663,798 | 5/1972 | Speidel | 219/354 X |
| 3,817,710 | 6/1974 | Mizutani | 219/354 X |
| 3,884,213 | 5/1975 | Smith | 126/21 A |
| 3,943,910 | 3/1976 | White | 126/41 R |
| 4,055,677 | 10/1977 | White | 99/386 X |
| 4,089,260 | 5/1978 | Brown | 99/388 X |
| 4,142,459 | 3/1979 | Lalancette | 99/401 X |
| 4,170,932 | 10/1979 | Lalancette | 99/331 X |
| 4,201,796 | 5/1980 | Harkins | 426/238 |
| 4,297,942 | 11/1981 | Benson et al. | 99/386 |
| 4,345,513 | 8/1982 | Holt | 99/332 X |
| 4,356,384 | 10/1982 | Gat | 219/354 X |
| 4,406,218 | 9/1983 | Hatakeyama | 99/401 |

FOREIGN PATENT DOCUMENTS 2339825 3/1975 Fed. Rep. of Germany ........ 99/385

Primary Examiner—Billy J. Wilhite
Attorney, Agent, or Firm—Shapiro and Shapiro

[57] ABSTRACT

An apparatus and method for charbroiling of food articles employs a source of radiant energy focused at a region of a surface of the food article that is small relative to the area of the surface and producing at that region an intense heat flux. The region is moved along the surface of the food article so as to char at least portions of the surface without overcooking the interior of the food article.

12 Claims, 4 Drawing Figures

COOKING APPARATUS AND METHOD

BACKGROUND OF THE INVENTION

This invention relates to the cooking of food articles and particularly to the charbroiling of meat, fish, and poultry.

Many people prefer the flavor of steak, for example, that is charred on the surface yet rare inside. In general, temperature, not time, determines the degree of doneness of protein foods. When the temperature of meat is raised to 130°-140° F., the meat changes from raw to rare, and remains rare even if kept at that temperature for an hour or more. Ideally, rare, charbroiled meat is brown or black on the outside, yet red, moist, and tender throughout the inside.

If charring is done with a heat source of insufficient intensity, the food will cook slowly, and the interior of the food will rise above 140° F. before the exterior has turned dark brown or black. If steak, for example, is placed in a 400° F. oven, by the time the surface has become dark brown, the interior will have become well done.

Because of limitations inherent in conventional broiling apparatus used in the home, meat broiled in the home is cooked too slowly. Fast cooking of the meat surface can be obtained in a charcoal broiler, for example, but most charcoal broiling is done outdoors because of the smoke produced and the danger of fire. Indoor charbroilers designed to minimize such problems are expensive and are usually installed only in deluxe kitchens.

SUMMARY OF THE INVENTION

The present invention provides an apparatus and method for charbroiling of meat, for example, that may be used indoors and that produces excellent results even when used by unskilled cooks. More particularly, the invention may be employed to provide a brown or black thin surface layer on the meat without raising the interior temperature of the food above about 140° F., so that there will be a minimum of well-done (brown) meat under the charred surface. If it is desired that the interior of the meat be cooked to a state other than rare, the interior temperature may be raised to any desired value in the range of from about 130° F. to about 170° F. by slow warming in an oven, for example, prior to or after charbroiling. The parts of the apparatus of the invention that become dirty in use are constructed so that they are machine-washable. Fat vapor (smoke) produced during broiling is treated to eliminate unpleasant odor and to avoid condensation on kitchen surfaces. A particular advantage of the invention is that the heat required for the charbroiling is produced electrically from a conventional 120 volt AC supply.

In one aspect, the invention provides apparatus for cooking a food article, comprising means for supporting the food article, a source of radiant energy, means for focusing energy from the source on a region of a surface of the food article that is small relative to the area of the surface and for producing at that region an intense heat flux, and means for moving the region along the surface so as to char at least portions of the surface so quickly that the interior of said food article does not cook beyond a desired state.

In another aspect, the invention provides a method of cooking a food article, comprising supporting the food article, focusing radiant energy on a region of a surface of the food article that is small relative to the area of the surface and producing at that region an intense heat flux, and moving said region along the surface so as to char at least portions of the surface so quickly that the interior of said food article does not cook beyond a desired state.

The invention will be further described in conjunction with the accompanying drawing, which illustrates a preferred and exemplary embodiment.

DESCRIPTION OF THE PREFERRED EMBODIMENT

In accordance with an important principle of the invention, a focused beam of radiant energy is employed to char one small area of a food article at a time. A square inch of meat, for example, can be charred in less than 15 seconds, and the interior will not have time to reach temperatures above about 140° F. Charring of the entire surface of the food article, or of successive regions of the surface, is achieved by relative movement between the heat flux and the food article. By virtue of the invention, it is possible to employ a commercially available studio-theater lamp as the heat source, and to obtain sufficiently intense heat energy from the lamp to char the surface of the food article quickly enough to avoid raising the interior temperature of the article above about 140° F.

Figure 1:
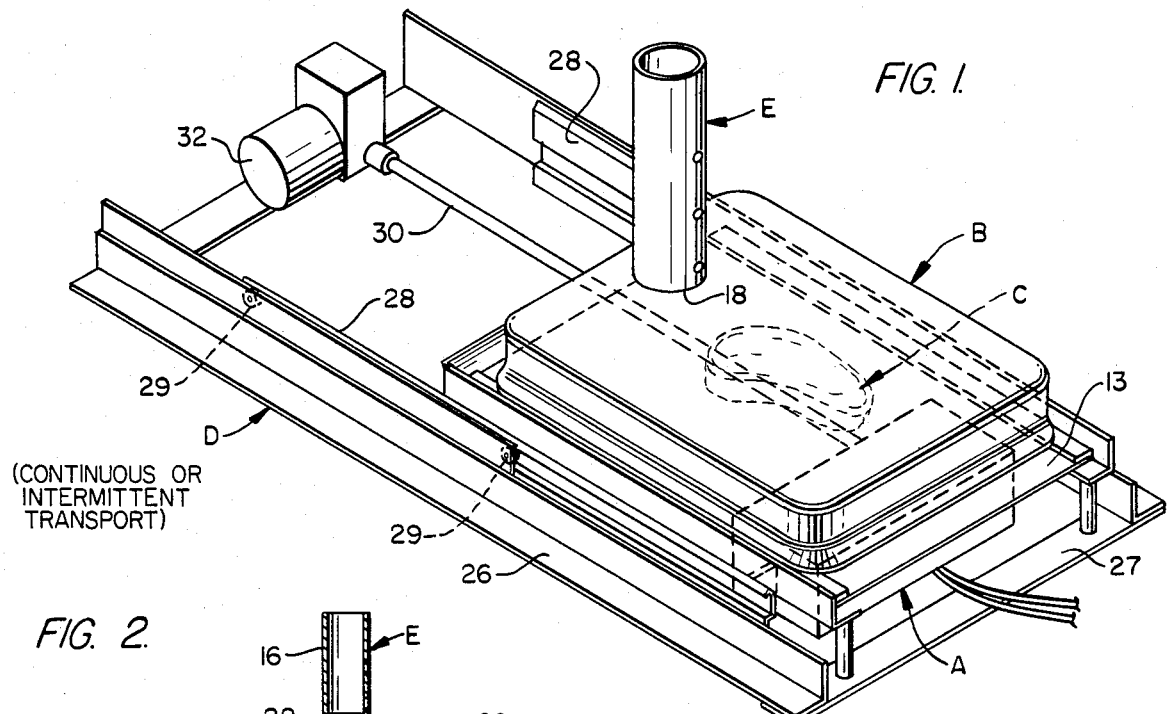
FIG. 1 is a perspective view of apparatus in accordance with the invention.
Figure 2:
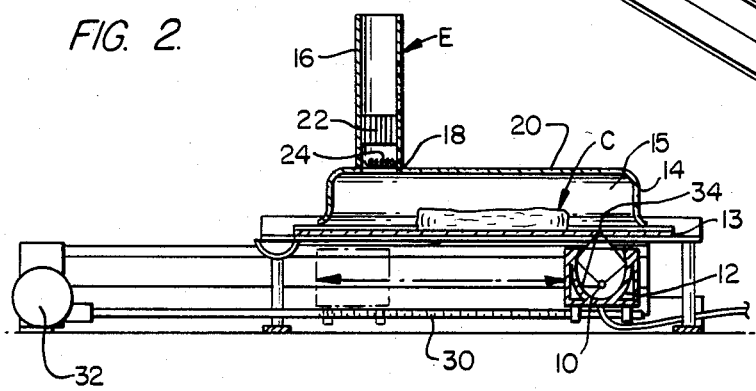
FIG. 2 is a longitudinal sectional view of the apparatus.

Referring now to the drawing, as shown in FIG. 1, principal parts of the apparatus of the invention include a source of radiant energy A, a machine-washable receptacle, such as a cassette B for a food article C, a transport D, and a smoke disposal unit E. In the preferred form, the radiant energy source is a studio-theater lamp employing an elongate tungsten filament (producing of the order of hundreds of watts per inch of filament length) in a sealed clear quartz tube with an argon-halogen atmosphere. A suitable lamp is the Philips 13989R lamp (279 watts/inch) or the Philips 6358R lamp (254 watts/inch), both sold by North American Philips Lighting Corporation, or equivalent lamps sold by Shogyo International Corp. The Philips lamps have a color temperature of 3200° K. The lamp, indicated by reference numeral 10 in FIG. 2, is preferably mounted in an elliptical reflector 12, with the axis of the lamp coincident with a first (internal) focal line of the reflector. The reflector, which is closed at opposite ends by flat reflective surfaces (not shown) is open at one side (upwardly in FIG. 2) so that a second focal line of the reflector is located externally. In the form shown, the external focal line is located on the upper surface of a rectangular plate or wall 13 (e.g., 10"×15"×0.150") forming the bottom of the cassette B. The cassette also includes an inverted rectangular dish 14 (e.g., 8"×12"×2") supported on the plate. The food article C is preferably supported on the upper surface of plate 13 in the cooking chamber 15 constituted by plate 13 and dish 14.

In the preferred form of the invention, plate 13 is formed of silica glass, such as Corning Vycor. This material is refractory, has a near-zero coefficient of thermal expansion and has a very high melting point. Dish 14 may be a rectangular Pyrex (borosilicate glass) baking dish. The dish may be darkened or have a metal cover to reduce or block the light transmitted upwardly through the dish. The silica glass plate 13 is transparent to radiant energy in the UV, visible, IR spectra and does not crack when splashed with water while hot. It has low specific heat, i.e., it stores very little heat. Thus, the food article supported on the plate will be cooked by radiant energy from lamp 10, but will not be cooked to any appreciable extent by heat stored in the plate.

The smoke disposal unit E may comprise a chimney 16 mounted (by means of a lip at the bottom) over a hole 18 (e.g., 2" diameter) in wall 20 of dish 14 and having holes in its side for admission of air. The chimney may enclose a catalytic unit including a honeycomb ceramic catalyst 22 and a small electrical (Nichrome) heater 24. An appropriate catalytic unit is the Torvex sold by DuPont. When the catalyst is heated to 600° F., the cooking vapors are burned to yield water vapor and carbon dioxide.

Figure 3:
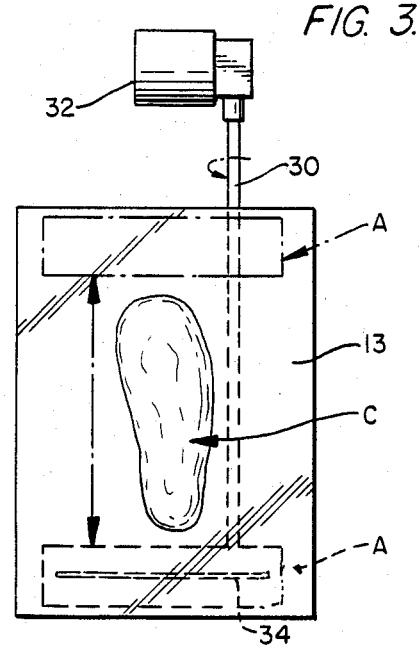
FIG. 3 is a top plan view of a portion of the apparatus.
Figure 4:
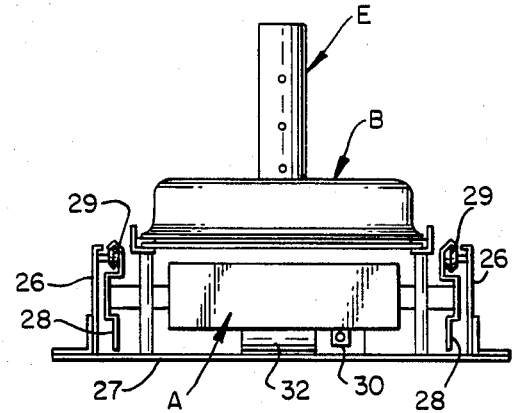
FIG. 4 is an end view of the apparatus as seen from the right in FIG. 1.

Radiant energy source A, which may be watercooled or otherwise maintained at a safe operating temperature, is moved relative to the food article C by the transport D. The food chamber 15 may be fixed, with plate 13 mounted on opposite, parallel, fixed rails 26 of a frame 27 of the transport. The radiant energy source A may be supported on parallel slides 28 movable along the rails on rollers 29, as by a screw drive 30, the screw of which may be driven by a gear-reduced electric motor 32, and the traveling nut of which may be attached to the bottom of radiant energy source A. The purpose of the transport is to scan past the food article C an intense linear region 34 of electromagnetic energy focused on the upper surface of plate 13 (see FIG. 3). The length of that region, in the preferred form, is perpendicular to the scanning direction. Within the broader aspects of the invention, other shapes of intensely heated regions, other forms of scanning or relative movement, and other drive mechanisms (such as spring drives) may be utilized.

As stated earlier, home-broiled steaks are, in general, cooked too slowly. By the time the outside is charred, the inside is over-cooked. To cook the surface rapidly enough to avoid undesired cooking of the interior of the meat, intense heat is required. The necessary high heat flux at the surface may be 1000 watts (1 KW) per square inch of meat surface, for example. If one wished to char one side of a 4"×8" steak all at once, an electrical heater would require 4×8=32 kilowatts. This is far beyond the capability of 120 volt AC service. The invention solves this problem by focusing 1000 to 2000 watts of heat on a small area of the surface of the food article just long enough to char it. Then the heat flux is moved relative to the food article to char another area.

The heat source employed in the preferred form of the invention produces at the external focal line of the elliptical reflector 12 an intense heat flux that is about 4 to 6 inches long and 3/16 to ¼ inch wide. Ideally, 100% of the radiant energy should be concentrated at the external focal region of the concentrator (reflector), but in practice the concentration will be somewhat less.

In the use of the invention, a food article C, such as a steak, is supported directly upon plate 13, and the inverted dish 14 is supported on the plate over the food article. Lamp 10 and heater 24 are energized, and the transport is then operated to scan the radiant energy source past the lower surface of the food article. Supporting the food article directly on the plate 13 ensures, without difficulty, that the lower surface that is to be charred is accurately positioned at the external focal line of the reflector 12. Withing the broader aspects of the invention, the radiant energy may be focused on the lower surface of a food article raised above the bottom of the cooking chamber on a support, or the radiant energy source and the food article may be relatively positioned for charring a surface of the food article facing upwardly or in another direction.

The scanning of the heat flux relative to the food article (indicated diagrammatically in FIG. 3) may be continuous or intermittent. In either case, the region of the food article surface upon which the heat flux is focused is small relative to the area of the surface. In a continuous mode, the scanning may be at a rate of the order of inches per minute (e.g., 2"/min.). However, within practical operating conditions for a lamp employed in the preferred embodiment (250 watts per inch of filament length), it is difficult to char the entire surface of a thin steak or hamburger continuously without bringing the interior of the meat to a medium or well-done temperature. It is preferred, therefore, to char a series of separate portions of the surface of the meat, to provide spaced black bars (say ¼ inch wide) on the surface of the meat, by holding the region 34 motionless for 20 to 30 seconds, for example, and then moving it about ¾ inch perpendicular to its length (e.g., in 3 seconds), again holding it motionless for about 20 to 30 seconds, etc. With this technique, using 250 watts per inch of filament length, for about 25 seconds, it is possible to keep the interior of a ⅝ inch thick steak rare while charring the surface adequately. A very thin piece of meat may be charred at each stop for 20 seconds, for example, while 30 seconds may be required for a thick one.

After a single pass scan has charred one surface of the food article (continuously or intermittently), the food article is turned over and the process is repeated. Scanning may take place unidirectionally or bidirectionally (for opposite sides), and the drive mechanism may be programmed by well-known control means to produce the type of scan desired.

Typically, the invention may employ a split phase drive motor controlled by a forward-reverse relay. Microswitches may be employed to detect opposite end excursions of the transport. A push button switch may be closed to energize the relay for forward drive of the motor, and the motor may be operated in reverse after a forward scan to return the transport to its initial position. During reverse movement of the transport, the lamp may be de-energized. Two clock-controlled switches may be employed to control the intermittent drive of the motor during the forward scan. One clock may run the motor for an operator-selected time (e.g., 0–5 seconds) between char bars. The other clock, which may be operator-adjustable for a 15–35 second range, determines the off time of the drive motor and hence the stationary time of the lamp to produce a char bar. The clocks may be interconnected so that at the end of the selected operating period for each clock, each clock energizes the other clock, and vice versa.

Drippings produced during the cooking of the food may be drawn off into a sump (not shown) beneath the cooking chamber. In a simple form, this may be accomplished by tilting the transport so that liquids leak out of one end of the cooking chamber into a sump attached to the lower end of plate 13.

If desired, an appropriate means, such as a jet pump, may be employed to move smoke from the cooking chamber through the chimney of the smoke disposal unit. For example, a nozzle of a small blower may be inserted through a hole in the side wall of the chimney and directed toward the chimney outlet to produce jet pumping. This requires an inlet path, e.g., leakage between the inverted dish 14 and plate 13, to provide an air flow. It has been found, however, that the apparatus of the invention works well without a pump. As long as new smoke is being produced, it moves the old smoke up and out. When the lamp is turned off, the smoke disappears in about one minute by condensation and/or drifting to the smoke disposal unit (by convection and diffusion).

If a turbo oven is employed to cook the interior of the meat beyond rare, it is preferred to bring the interior of the meat to the desired temperature in the oven before charbroiling, particularly if the meat is thick, to ensure that the meat is hot when served. The turbo oven may be employed to bring the interior of the food to any selected temperature within the 120°-170° F. range, for example. Since the rate of flow of heat into the food is proportional to the difference between the oven temperature and the temperature at the center of the food article, there must be a differential between the oven temperature and the interior temperature of the food article. However, it is desired that the temperature gradient be limited to about 20° F. to avoid over-cooking the interior of the food. The food is left in the turbo oven just long enough to cook the interior to the desired state. For example, a 1½ inch steak may be warmed for 30 to 60 minutes in a 150° F. turbo oven before charring. This will produce a thick charbroiled rare steak in 1 to 1¼ hours. A thin charbroiled rare steak (e.g., ⅝ inch) may be produced by charbroiling alone in accordance with the invention (i.e., without the use of a turbo oven). Within the broader aspects of the invention, if a turbo oven is used, the cooking chamber 15 may be converted to a turbo oven by recirculating air in the chamber past the heater 24.

Although one could employ a heat sensing probe to sense the interior temperature of the food, the cooking state of the interior of the food may be approximately determined by varying the number of seconds spent in charring each charred bar of an intermittently driven charbroiling apparatus and by varying the space between bars. A table showing the char time as a function of meat thickness and desired interior temperature may be prepared from experimental data. The starting temperature of the food article (refrigerated, frozen or room temperature) must be specified. A turbo oven may be used to bring the food to a known starting temperature, said 70° F. as a prelude to charbroiling.

While a preferred embodiment of the invention has been shown and described, it will be apparent to those skilled in the art that changes can be made in this embodiment without departing from the principles and spirit of the invention, the scope of which is defined in the appended claims.

The invention claimed is:

1. Apparatus for cooking meat or the like, comprising a cooking chamber having means for supporting the meat or the like therein, a source of radiant energy including a lamp and means for focusing energy from said lamp on a region of a surface of said meat or the like that is small relative to the area of said surface and for producing at that region an intense heat flux, said lamp having a filament capable of producing of the order of hundreds of watts per inch of filament length from a 120 volt AC supply, said lamp being located outside of said cooking chamber and said cooking chamber having a wall that is transmissive to said radiant energy and through which said radiant energy is transmitted to said region, means for moving said source relative to said cooking chamber along said surface so as to move said region and so as to char at least portions of said surface so quickly that the interior of said meat or the like does not cook beyond a desired state, and means for the disposal of smoke generated in said cooking chamber.

2. Apparatus in accordance with claim 1, wherein said focusing means comprises a reflector.

3. Apparatus in accordance with claim 2, wherein said reflector is elliptical, said lamp is located at an internal focus of said reflector, and said energy is focused at an external focus of said reflector.

4. Apparatus in accordance with claim 3, wherein said region is elongated.

5. Apparatus in accordance with claim 4, wherein said region is about 4" to 6" long and about 3/16" wide.

6. Apparatus in accordance with claim 1, wherein said wall is a bottom wall of said chamber, said meat or the like is supported on said wall, and said energy is focused upon an upper surface of said wall from beneath the wall.

7. Apparatus in accordance with claim 1, wherein the cooking chamber comprises machine-washable parts.

8. Apparatus in accordance with claim 1, wherein said moving means moves said region continuously.

9. Apparatus in accordance with claim 8, wherein said moving means moves said region at a rate of the order of inches per minute.

10. Apparatus in accordance with claim 1, wherein said moving means moves said region intermittently.

11. Apparatus in accordance with claim 10, wherein said moving means holds said region substantially motionless for a period of seconds, then moves said region for a substantially shorter period, and then holds said region substantially motionless again, thereby charring a series of separate portions of said surface.

12. Apparatus in accordance with claim 1, wherein said smoke disposal means comprises a catalytic converter.

* * * * *